United States Patent
Mitsuhashi et al.

(10) Patent No.: US 6,717,693 B2
(45) Date of Patent: Apr. 6, 2004

(54) INFORMATION PROCESSING APPARATUS AND OUTPUT APPARATUS

(75) Inventors: Shunya Mitsuhashi, Tokyo (JP); Satoshi Nagata, Tama (JP); Yoshifumi Okamoto, Yokohama (JP); Tetsuya Morita, Kawasaki (JP); Akihiro Shimura, Tokyo (JP); Nobuhiko Sato, Yokohama (JP); Takanori Nishijima, Tokyo (JP); Masaki Unishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 09/983,428

(22) Filed: Oct. 24, 2001

(65) Prior Publication Data

US 2002/0030841 A1 Mar. 14, 2002

Related U.S. Application Data

(62) Division of application No. 08/076,784, filed on Jun. 15, 1993.

(30) Foreign Application Priority Data

Jun. 19, 1992 (JP) .............................................. 4-186360

(51) Int. Cl.⁷ ................................................. G06F 3/12
(52) U.S. Cl. ....................... 358/1.15; 358/1.9; 358/1.13; 358/1.15; 358/1.12; 358/1.14; 399/8; 399/9
(58) Field of Search ................................. 358/1.9, 1.13, 358/1.15, 1.12, 1.14; 399/8, 9

(56) References Cited

U.S. PATENT DOCUMENTS

| 5,036,361 A | 7/1991 | Filion et al. ................. 355/209 |
|---|---|---|
| 5,045,880 A | 9/1991 | Evanitsky et al. ........... 355/200 |
| 5,075,874 A | 12/1991 | Steeves et al. .............. 395/112 |
| 5,075,875 A | 12/1991 | Love et al. .................. 395/117 |
| 5,084,875 A | 1/1992 | Weinberger et al. ........ 371/291 |
| 5,164,842 A | 11/1992 | Gauronski et al. .......... 358/401 |
| 5,226,112 A | 7/1993 | Mensing et al. ............. 395/114 |
| 5,268,993 A | * 12/1993 | Ikenoue et al. ............. 358/1.13 |
| 5,323,393 A | 6/1994 | Barrett et al. ............... 370/449 |
| 5,371,837 A | * 12/1994 | Kimber et al. ............. 358/1.13 |
| 5,420,667 A | * 5/1995 | Kaneko et al. ............. 358/1.14 |
| 5,431,505 A | * 7/1995 | Kato et al. .................. 400/703 |
| 5,490,287 A | 2/1996 | Itoh et al. ................... 358/442 |
| 5,694,618 A | * 12/1997 | Hibino ........................ 710/14 |
| 5,706,411 A | 1/1998 | McCormick et al. ....... 395/113 |
| 5,825,993 A | 10/1998 | Shimura et al. ............ 395/115 |

FOREIGN PATENT DOCUMENTS

| EP | 444251 | 9/1991 |
|---|---|---|
| JP | 3253961 | 11/1991 |
| JP | 05324226 | * 12/1993 |
| WO | 92/03789 | 3/1992 |
| WO | 94/11804 | 5/1994 |

OTHER PUBLICATIONS

Frank Hayes, "The Printers Talk Back", Dec. 1993, pp. 1–5.
M. C. MaGuire, "A Review Of Human Factors Guidelines And Techniques For The Design Of Graphical Human–Computer Interfaces", Computers & Graphics, vol. 9, No. 3, 1985, pp. 221–235.

* cited by examiner

Primary Examiner—Edward Coles
Assistant Examiner—Ashanti Ghee
(74) Attorney, Agent, or Firm—Fitzpatrick, Cella, Harper & Scinto

(57) ABSTRACT

An information processing apparatus includes an acquiring unit for acquiring information from a printer connected through a bidirectional interface, and a control unit for controlling a display status of a virtual printer, which is displayed on a display screen and represents the printer, on the basis of the information acquired by the acquiring unit. An output apparatus includes a setting unit for setting an operating environment, and a changing unit for changing operating environment information set by the setting unit on the basis of information acquired from an information processing apparatus connected through a bidirectional interface.

30 Claims, 18 Drawing Sheets

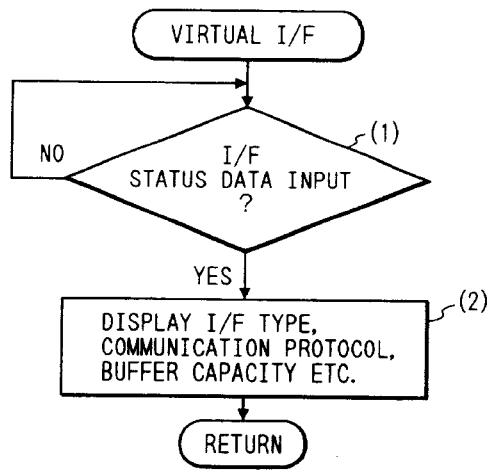
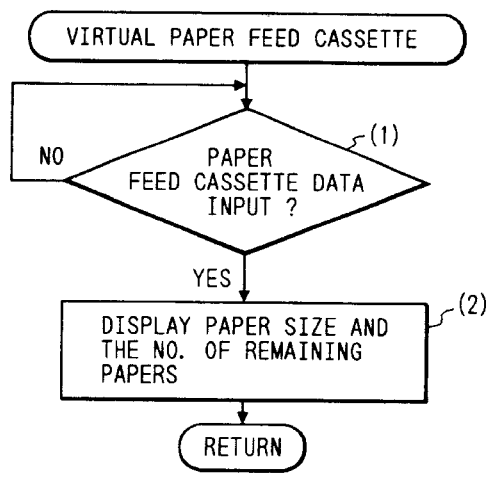

INFORMATION PROCESSING APPARATUS AND OUTPUT APPARATUS

This application is a division of application Ser. No. 08/076,784, filed Jun. 15, 1993, allowed.

BACKGROUND OF THE INVENTION

1. Field of the Invention

The present invention relates to an information processing apparatus for sending data to an output apparatus, such as a printer, which is connected through a bidirectional interface, and an output apparatus for receiving data from an information processing apparatus, such as a host computer, which is connected through a bidirectional interface, and performing output processing.

2. Related Background Art

Recently, a recording apparatus or a recording system capable of executing processing of the above sort is constructed by a host computer and a printer which is connected to the host computer through an interface (e.g., a Centronics interface). The recording apparatus or the recording system analyzes output information supplied from the host computer and develops bit-map data as output data of, e.g., a laser beam printer. The apparatus or the system then scan-exposes a photosensitive drum with a laser beam modulated on the basis of this developed data, thereby performing image recording.

In the case of a printer with an emulation function, a plurality of printer control language systems can be processed; the printer can execute printing while switching between an emulation mode and a native mode in accordance with applications that a user executes. The printer of this type has switches for switching the printer control languages and card slots for giving switching designation.

In addition, as the printing control functions of a printer have been increased in number in recent years, operations of an operation panel of a printer main body have become complicated. Therefore, a so-called "setup utility" by which a host computer performs various settings of a printer connected to the host computer generally has set items appearing in the form of a menu on a display.

Such a "setup utility" allows a host computer to perform operations which are usually performed from an operation panel of a printer. In many cases, however, the host computer performs operations for selecting items one-sidedly for the printer, so the status of the printer is not reflected on the display in real time. In addition, a real-time display of a paper feed condition of the printer is often performed on only the panel of the printer main body.

Furthermore, if some error occurs in a printer located apart from a host computer, an operator operating the host computer moves to the installation location of the printer to perform a recovery operation for that error, checking an error code displaying on a display panel of a printer operating unit while referring to a manual, and executing a necessary error recovery operation.

As described above, when the environment of a printer system is constructed by a host computer and a printer connected to the host computer through a predetermined interface, an operator cannot visually understand the settings, status, and error recovery of the printer. This results in very poor operability due to heavy loads of a printer environment setting operation and an error recovery operation on the operator.

SUMMARY OF THE INVENTION

The present invention has been made to solve the above problems, and has as its object to provide an information processing apparatus and an output apparatus, in which the setting statuses of a printer connected and a virtually displayed printer are monitored and set to correspond to each other, operation designation for the printer can be realized by operation designation on the virtual printer by simulating the printing status and the printer panel display status of the printer on the virtual printer, and the status of a printing sequence of the printer can be visually checked on the virtual printer.

In order to achieve the above object of the present invention, there is provided an information processing apparatus comprising acquiring means for acquiring information from a printer connected through a bidirectional interface, and control means for controlling a display status of a virtual printer, which is displayed on a display screen and represents the printer, on the basis of the information acquired by the acquiring means.

In order to achieve the above object of the present invention, there is provided an output apparatus comprising setting means for setting an operating environment, and changing means for changing operating environment information set by the setting means on the basis of information acquired from an information processing apparatus connected through a bidirectional interface.

As described above, the operating environmental status information of a printer connected to a host computer via a bidirectional interface is acquired, and the simulated operation display status of a virtual printer displayed on the display screen of the host computer is controlled on the basis of the acquired operating environmental status information. In addition, designation information for the virtual printer is acquired from the host computer, and the operating environmental status of the printer is set to correspond to that of the virtual printer on the basis of the acquired designation information. Therefore, the connected printer can be displayed as a visual cubic image on the screen of the host computer by means of the virtual printer. It is also possible to display the status and settings of the printer on the virtual printer and reflect the settings of the virtual printer on the connected printer.

Furthermore, the panel setting status information of a printer connected to a host computer through a bidirectional interface is acquired, and the simulated operation display status of a virtual panel displayed on the display screen of the host computer is controlled on the basis of the acquired panel setting status information. The designation information for the virtual panel is also acquired from the host computer, and the panel setting status of the printer is set to correspond to that of the virtual panel on the basis of the acquired designation information. This makes it possible to display the panel status and settings of the printer on the virtual panel and reflect the settings of the virtual panel on the panel of the printer.

A user, therefore, can activate the panel simulation or the setup utility of the printer by a simple operation of designating a desired portion of the printer virtually displayed on the screen of the host computer. This enables the user to confirm the printer status and perform environmental setting of the printer without making any mistakes while visually monitoring the printer virtually displayed on the host computer.

BRIEF DESCRIPTION OF THE DRAWINGS

FIG. 15 is a flow chart showing an interface simulation sequence shown in FIG. 5;

FIG. 16 is a flow chart showing a paper feed cassette simulation sequence shown in FIG. 5;

DESCRIPTION OF THE PREFERRED EMBODIMENT

Before an explanation of the arrangement of this embodiment, the arrangements of a laser beam printer and an ink jet printer suitable for this embodiment will be described below with reference to FIGS. 1 to 3. Note that a printer to which this embodiment is applied is not limited to the laser beam printer and the ink jet printer but may be a printer of another printing system.

Figure 1:
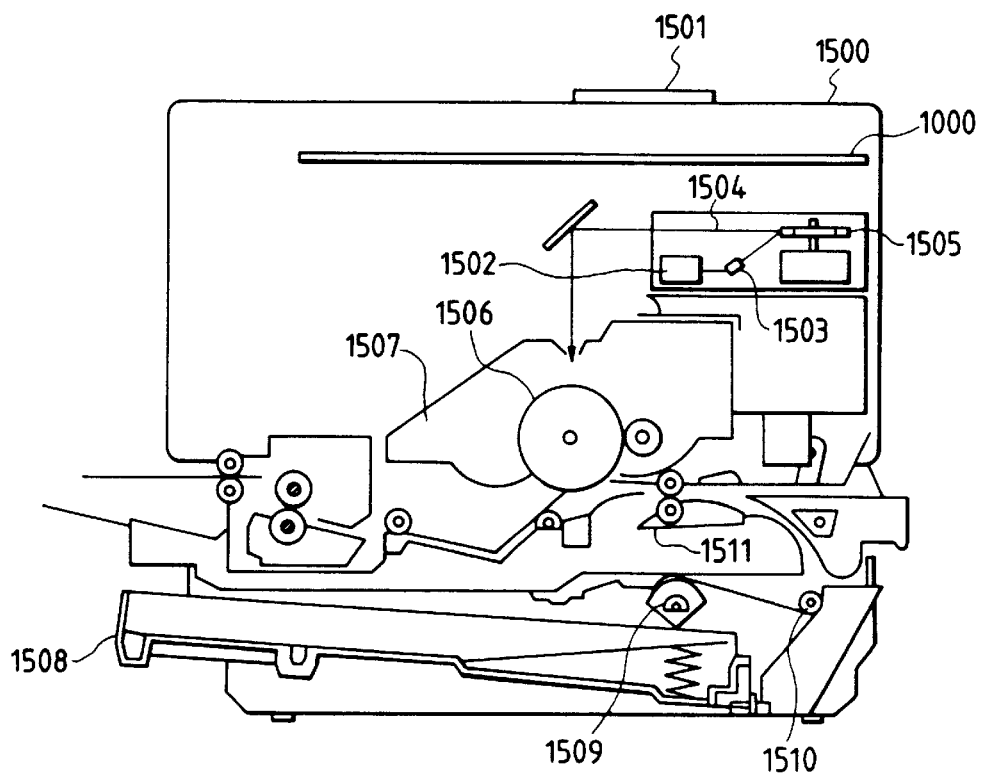
FIG. 1 is a sectional view showing the arrangement of a first recording apparatus to which the present invention is applicable.

FIG. 1 is a sectional view showing the arrangement of a first recording apparatus, for example, a laser beam printer (LBP), to which the present invention is applicable.

Referring to FIG. 1, an LBP main body 1500 receives and stores print information (e.g., character codes), form information, or macro instructions supplied from an externally connected host computer. The LBP main body 1500 forms character patterns or form patterns corresponding to the input information and forms images on recording paper as a recording medium. The LBP main body 1500 includes an operation panel 1501, on which switches and LED indicators for operations are arranged, and a printer control unit 1000 for controlling the overall LBP main body 1500 and analyzing character information and the like supplied from the host computer. The printer control unit 1000 primarily converts character information into a video signal with the corresponding character pattern and applies the signal to a laser driver 1502. The laser driver 1502 is a circuit for driving a semiconductor laser 1503; the laser driver 1502 switches on and off a laser beam 1504 emitted from the semiconductor laser 1503 in accordance with the input video signal. The laser beam 1504 scan-exposes an electrostatic drum 1506 while being oscillated sideways by a rotary polygon mirror 1505. As a result, an electrostatic latent image of the character pattern is formed on the electrostatic drum 1506. This latent image is developed by a developing unit 1507 arranged around the electrostatic drum 1506 and transferred onto recording paper. Cut sheets are used as the recording paper, and these cut sheets are housed in a paper cassette 1508 attached to the LBP main body 1500. The cut sheets are fed into the printer and supplied to the electrostatic drum 1506 by a paper supply roller 1509 and paper feed rollers 1510 and 1511.

Figure 2:
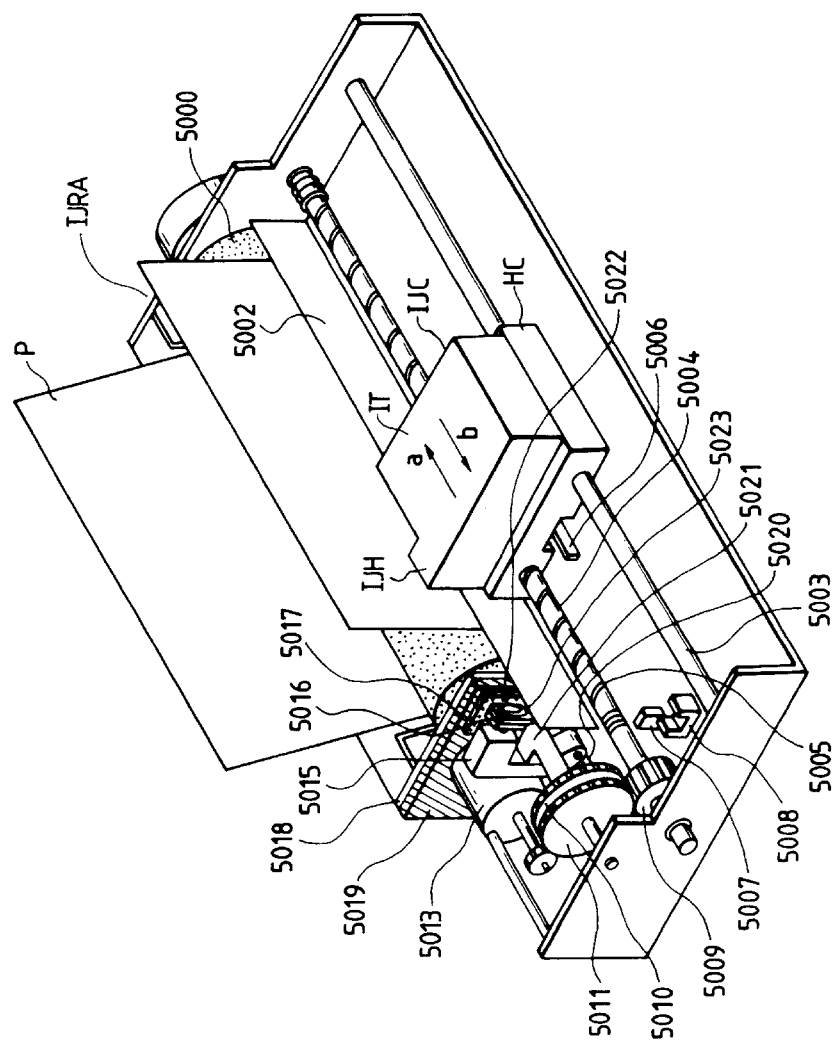
FIG. 2 is a perspective view showing the outer appearance of a second recording apparatus to which the present invention is applicable.

FIG. 2 is a perspective view showing the outer appearance of a second recording apparatus, for example, an ink jet recording apparatus (IJRA), to which the present invention is applicable.

Referring to FIG. 2, a carriage HC engaging with a spiral groove 5004 of a lead screw 5005 which is rotated in association with the forward and backward rotations of a drive motor 5013 via driving force transmission gears 5011 and 5009 has a pin (not shown) and is therefore reciprocated in directions indicated by arrows a and b. An ink jet cartridge UC is mounted on the carriage HC. A paper holding plate 5002 urges paper against a platen 5000 over the full width in the carriage moving direction. Photocouplers 5007 and 5008 function as home position detecting means for checking the presence of a lever 5006 of the carriage in this area and performing switching between the rotational directions of the motor 5013. A support member 5016 supports a cap member 5022 for capping the entire surface of a recording head, and a sucking means 5015 for sucking the interior of the cap to perform suction-recovery for the recording head through an opening 5023 inside the cap. A cleaning blade 5017 can be moved forward and backward by a member 5019. A main body support plate 5018 supports the members 5017 and 5019. A lever 5021 for starting suction of the suction-recovery moves in association with the movement of a cam 5020 which engages with the carriage, controlling the driving force from the drive motor through a known transmitting means, such as clutch switching.

The apparatus is arranged such that capping, cleaning, and suction-recovery can be performed at their respective positions by the action of the lead screw 5005 when the carriage moves to an area on the home position side; that is, a desired operation need only be performed at a timing known to those skilled in the art.

Figure 3:
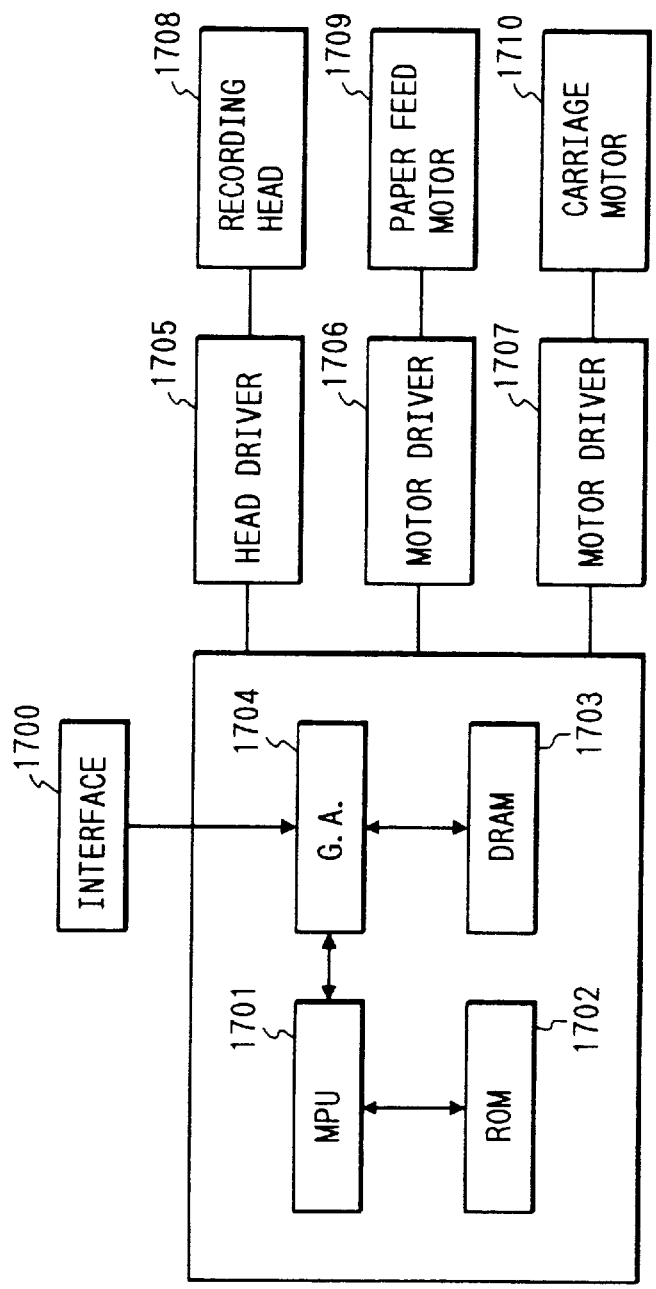
FIG. 3 is a block diagram for explaining the control system of the second recording apparatus shown in FIG. 2.

FIG. 3 is a block diagram for explaining the control system of the second recording apparatus shown in FIG. 2.

Referring to FIG. 3, this control system includes an interface 1700 for applying recording signals, an MPU 1701, a program ROM 1702 for storing, e.g., control programs to be executed by the MPU 1701, and a DRAM 1703 for storing various data (such as the recording signals and recording data to be supplied to a head). A gate array 1704 controls the supply of the recording data to a recording head 1708 and also controls the transfer of data between the interface 1700, the MPU 1701, and the DRAM 1703. A carriage motor 1710 carries the recording head 1708, and a paper feed motor 1709 feeds recording paper. A head driver 1705 drives the recording head, a motor driver 1706 drives the paper feed motor 1709, and a motor driver 1707 drives the carriage motor 1710.

In the recording apparatus with the above arrangement, when a recording signal is applied from a host computer 100 (to be described later) through the interface 1700, this recording signal is converted into recording data for printing by the gate array 1704 and the MPU 1701. Then the motor drivers 1706 and 1707 are driven, and the recording head is also driven by the recording data supplied to the head driver 1705, thereby executing printing.

The MPU 1701 can perform communications with the host computer 100 (to be described later) through the interface 1700; the MPU 1701 can inform the host computer 100 (to be described later) of memory information related to the DRAM 1703 and resource data (including operating environmental status information and panel setting status information to be described later).

Embodiment

Figure 4:
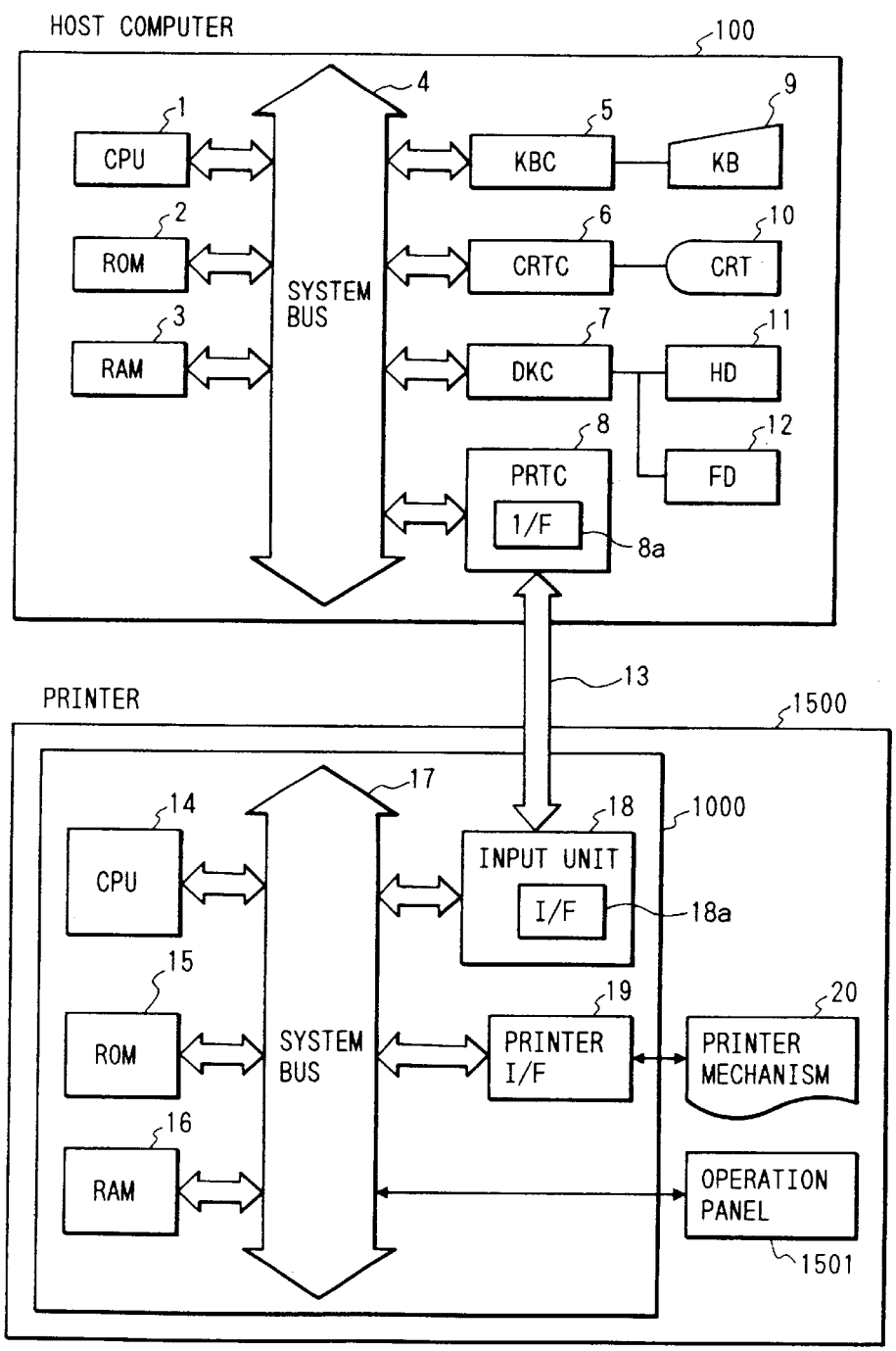
FIG. 4 is a block diagram for explaining the arrangement of a printer control system according to one embodiment of the present invention.

FIG. 4 is a block diagram for explaining the arrangement of a printer control system according to one embodiment of the present invention. The first embodiment will be described below by taking the laser beam printer (FIG. 1) as an example. Note that the present invention can be applied to any of a single apparatus, a system comprising a plurality of apparatuses, and a system in which processing is executed via a network, such as a LAN, provided that the functions of the present invention are executed.

Referring to FIG. 4, the host computer 100 has a CPU 1 for executing processing for documents consisting of graphics, images, characters, tables (including spreadsheets), and the like on the basis of document processing programs stored in a ROM 2. The CPU 1 systematically controls individual devices connected to a system bus 4.

Figure 5:
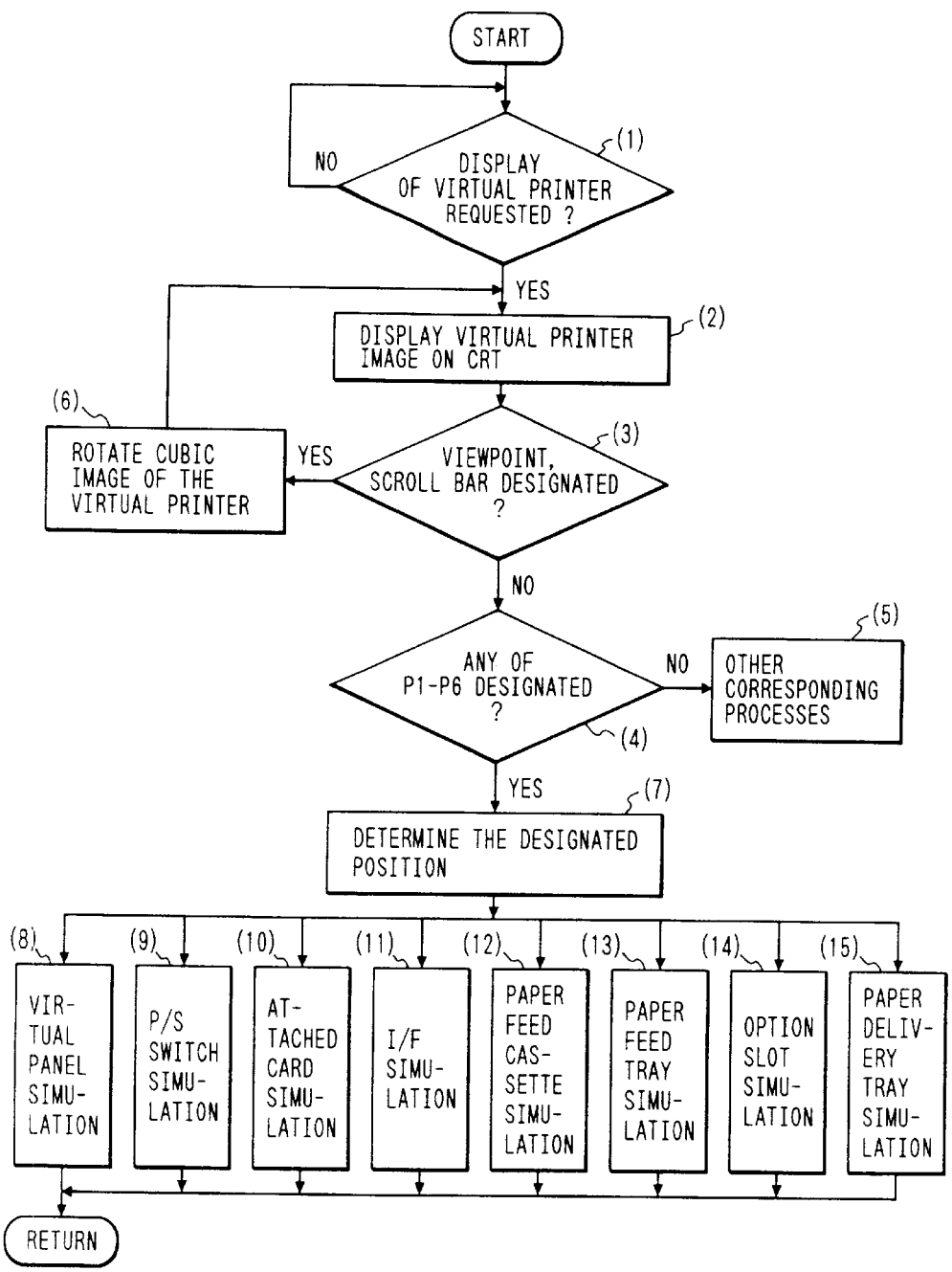
FIG. 5 is a flow chart showing a virtual printer display sequence in the printer control system according to the present invention.

The ROM 2 stores the control programs of the CPU 1 shown in the flow charts of FIG. 5 and the like. A RAM 3 serves as a main memory and a work area for the CPU 1. A keyboard controller (KBC) 5 controls key inputs from a keyboard 9. A CRT controller (CRTC) 6 controls a display on a CRT display (CRT) 10. A disk controller (DKC) 7 controls access to a hard disk (HD) 11 and a floppy disk (FD) 12 which store boot programs, various applications, font data, user files, edit files, and virtual printer image data (to be described later). A printer controller (PRTC) 8 is connected to the printer 1500 through a predetermined bidirectional interface (interface) 13 and executes processing for controlling communications with the printer 1500. Interface circuits 8a and 18a control command communication processing and recording information processing executed between the printer 1500 and the host computer 100 through the interface 13.

The CPU 1 executes processing for developing (rasterizing) an outline font into a display information RAM set in the RAM 3, allowing WYSIWYG on the CRT 10. The CPU 1 also opens various registered windows on the basis of commands designated by a mouse cursor (not shown) or the like on the CRT 10, executing various tasks of data processing. In addition, the CPU 1 manages the virtual printer image data or the virtual panel image data stored in the hard disk 11. That is, the CPU 1 controls the setting of a printer mode on the basis of designation by a pointing device (not shown) for the virtual printer displayed on the CRT 10 and displays the setting status on the virtual display unit. The CPU 1 then transfers the mode setting information to the printer 1500, and the CPU 14 controls the setting of the display status on the operation panel 1501 so that the printer setting statuses of the actual and virtual printers correspond to each other. The setting information (stored in the RAM 16) on the operation panel 1501 is also informed to the host computer 100. The CPU 1 controls the display of the virtual printer so that the display status of the virtual printer also corresponds to the mode setting status of the printer.

In the printer 1500, a printer CPU 14 systematically controls access to various devices connected to a system bus 17 on the basis of control programs and the like (indicated by the flow chart shown in FIG. 11) stored in a ROM 15 and outputs image signals as print data to a printer mechanism (printer engine) 20 connected through a printer interface 19. The memory capacity of a RAM 16 can be extended by an optional RAM connected to an expansion port. Note that the RAM 16 stores operating environmental status information and panel set status information (to be described later), and the information is sequentially updated by the CPU 14.

The printer control system also includes at least one card slot (not shown) so that optional font cards and cards (emulation cards) storing programs for interpreting printer control languages of different language systems can be connected and used, in addition to internally stored fonts. Note that the above-mentioned panel setting status information and the like may be stored in an NVRAM (not shown).

In the printer control system with the above arrangement, when the CPU 1 acquires operating environmental status information from the RAM 16 in the printer connected to the host computer 100 through the bidirectional interface 13, the CPU 1 controls the simulated operation display status of the virtual printer displayed on the display screen (CRT 10) of the host computer 100. In addition, when the CPU 14 acquires designation information for the virtual printer from the host computer 100, the CPU 14 sets the matching between the operating environmental statuses of the printer and the virtual printer on the basis of the acquired designation information. Therefore, the connected printer can be displayed as a visual cubic image on the screen of the host computer by means of the virtual printer. It is also possible to display the status and settings of the printer on the virtual printer and reflect the settings of the virtual printer on the printer.

The virtual printer control operation will be described below with reference to the flow chart shown in FIG. 5 and the virtual display statuses shown in FIGS. 6 to 9.

FIG. 5 is a flow chart showing a virtual printer display sequence performed by the CPU 1 in the printer control system according to the present invention, in which processing steps (1) to (15) are illustrated.

In step (1), the CPU 1 checks whether a display of the virtual printer is requested by designation by the pointing device (not shown) or the keyboard 9 of the host computer 100. If YES in step (1), the flow advances to step (2), and, as shown in FIG. 6, the CPU 1 displays a 3D image (three-dimensional image) of the virtual printer corresponding to the connected printer 1500 in a window W1 on the CRT 10.

Subsequently, in step (3), the CPU 1 checks whether a viewpoint and scroll bars SB1 and SB2 are designated by a cursor K through the use of the pointing device (not shown).

If YES in step (3), the CPU 1 rotates the cubic image of the virtual printer in the directions designated by the scroll bars SB1 and SB2 in step (6), and the flow returns to step (2).

Figure 6:
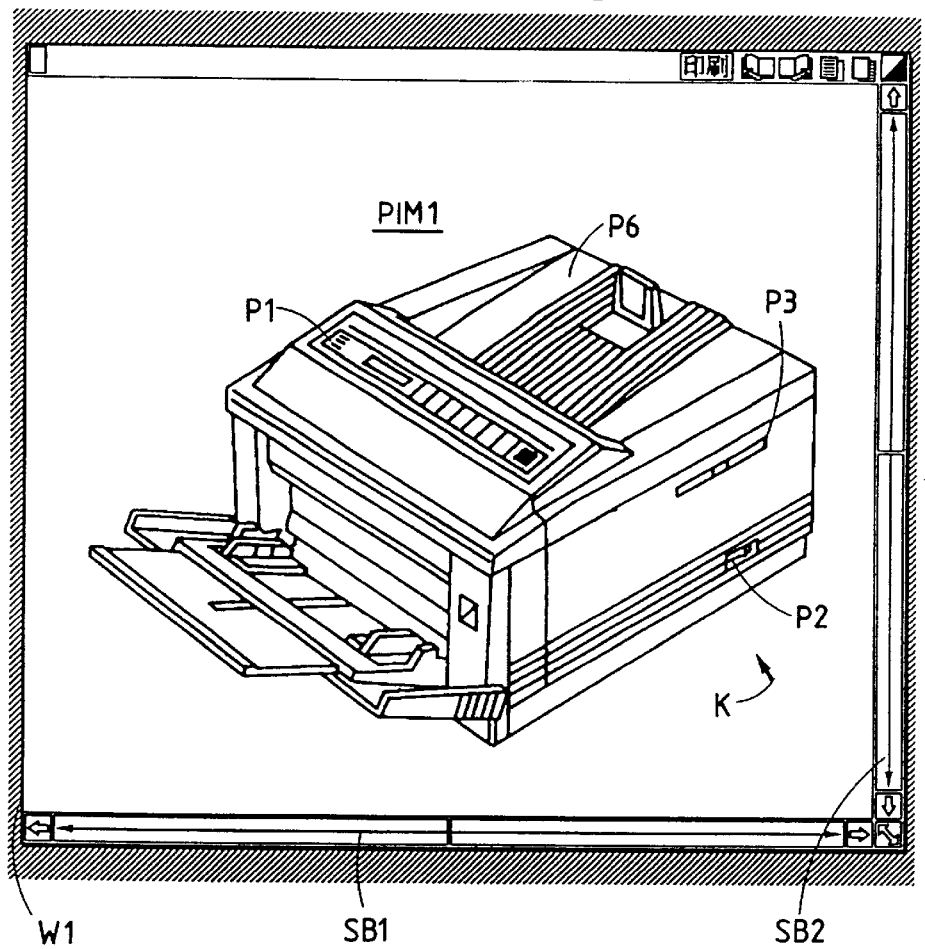
FIG. 6 is a view showing a virtual printer display transition status in the printer control system according to the present invention.
Figure 7:
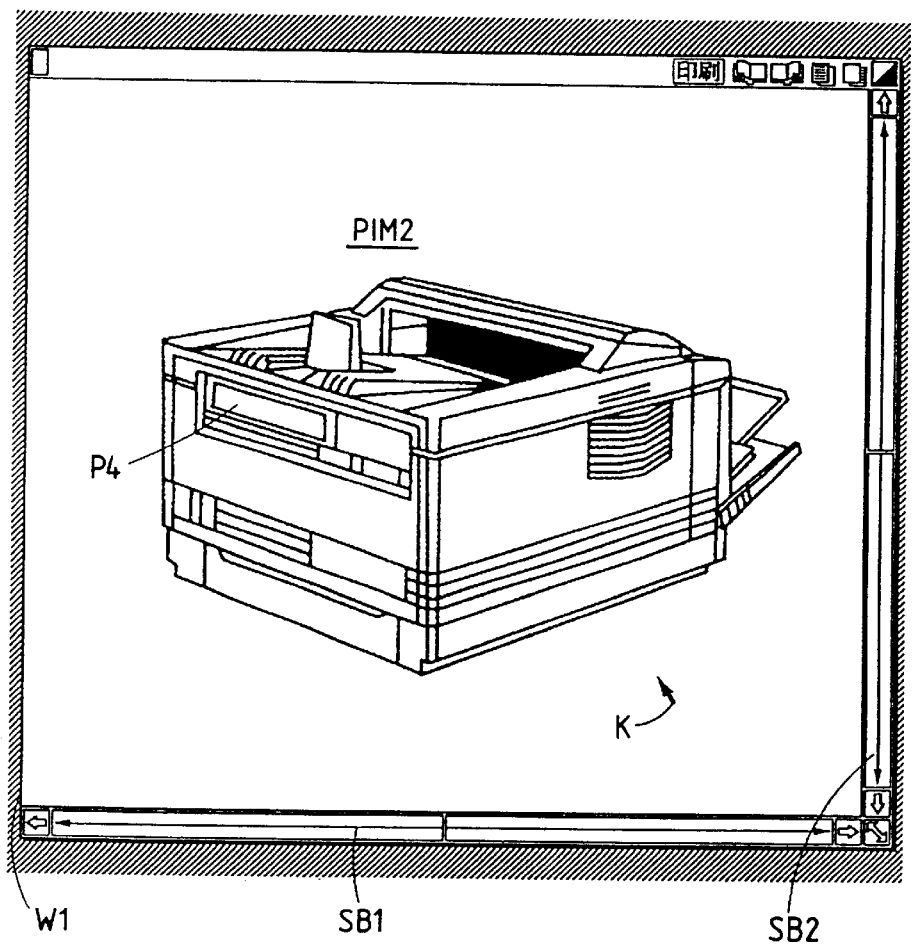
FIG. 7 is a view showing a virtual printer display transition status in the printer control system according to the present invention.
Figure 8:
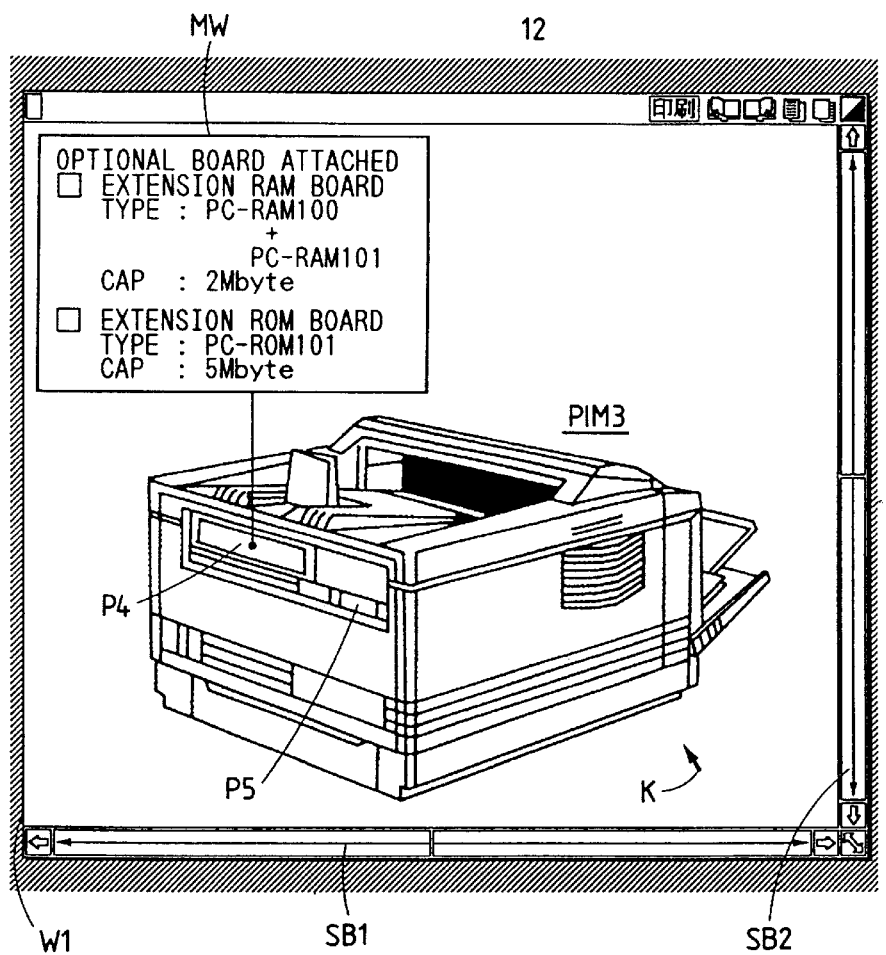
FIG. 8 is a view showing a virtual printer display transition status in the printer control system according to the present invention.
Figure 9:
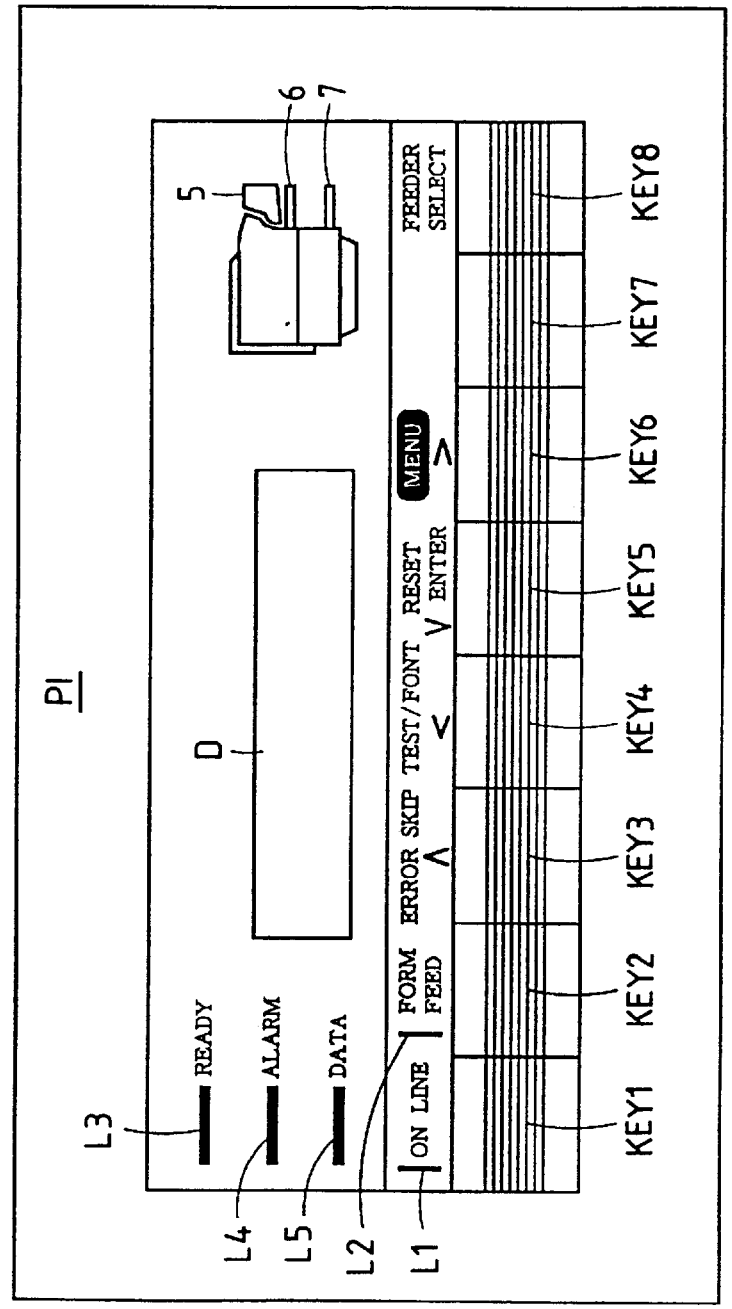
FIG. 9 is a view showing a virtual printer display transition status in the printer control system according to the present invention.

In step (4), the CPU 1 checks whether any of desired positions P1 to P6 in virtual printer images PIM1 to PIM3 shown in FIGS. 6 to 8 is designated by the cursor. If NO in step (4), the CPU 1 executes other corresponding processes in step (5). If YES in step (4), the CPU 1 determines the position designated by the cursor K, activating one of simulators (to be described in detail later) corresponding to the designated position (steps (8) to (15)), and ending the processing.

As described above, the operating environmental status information (stored in the RAM 16) of the printer 1500 connected to the host computer 100 through the bidirectional interface (e.g., RS232C) 13 is acquired, and the simulated operation display status of the virtual printer displayed on the display screen of the host computer 100 is controlled on the basis of the acquired operating environmental status information. In addition, the designation information for the virtual printer (virtual printer images PIM1 to PIM3) is acquired from the host computer 100, and the operating environmental status of the printer 1500 is set to correspond to that of the virtual printer on the basis of the acquired designation information. Therefore, the printer 1500 connected can be displayed as a visual cubic image on the screen of the host computer 100 by means of the virtual printer. It is also possible to display the status and settings of the printer 1500 on the virtual printer and reflect the settings of the virtual printer on the printer 1500.

Furthermore, the panel setting status information stored in the RAM 16 of the printer 1500 connected to the host computer 100 through the bidirectional interface 13 is acquired, and the simulated operation display status of the virtual panel (the panel image PI shown in FIG. 9) displayed on the display screen of the host computer is controlled on the basis of the acquired panel setting status information. The designation information for the virtual panel is also acquired from the host computer 100, and the setting status of the operation panel 1501 of the printer 1500 is set to correspond to that of the virtual panel on the basis of the acquired designation information. This makes it possible to display the panel status and the panel settings of the printer 1500 on the virtual panel and reflect the settings of the virtual panel on the panel of the printer 1500.

Figure 10:
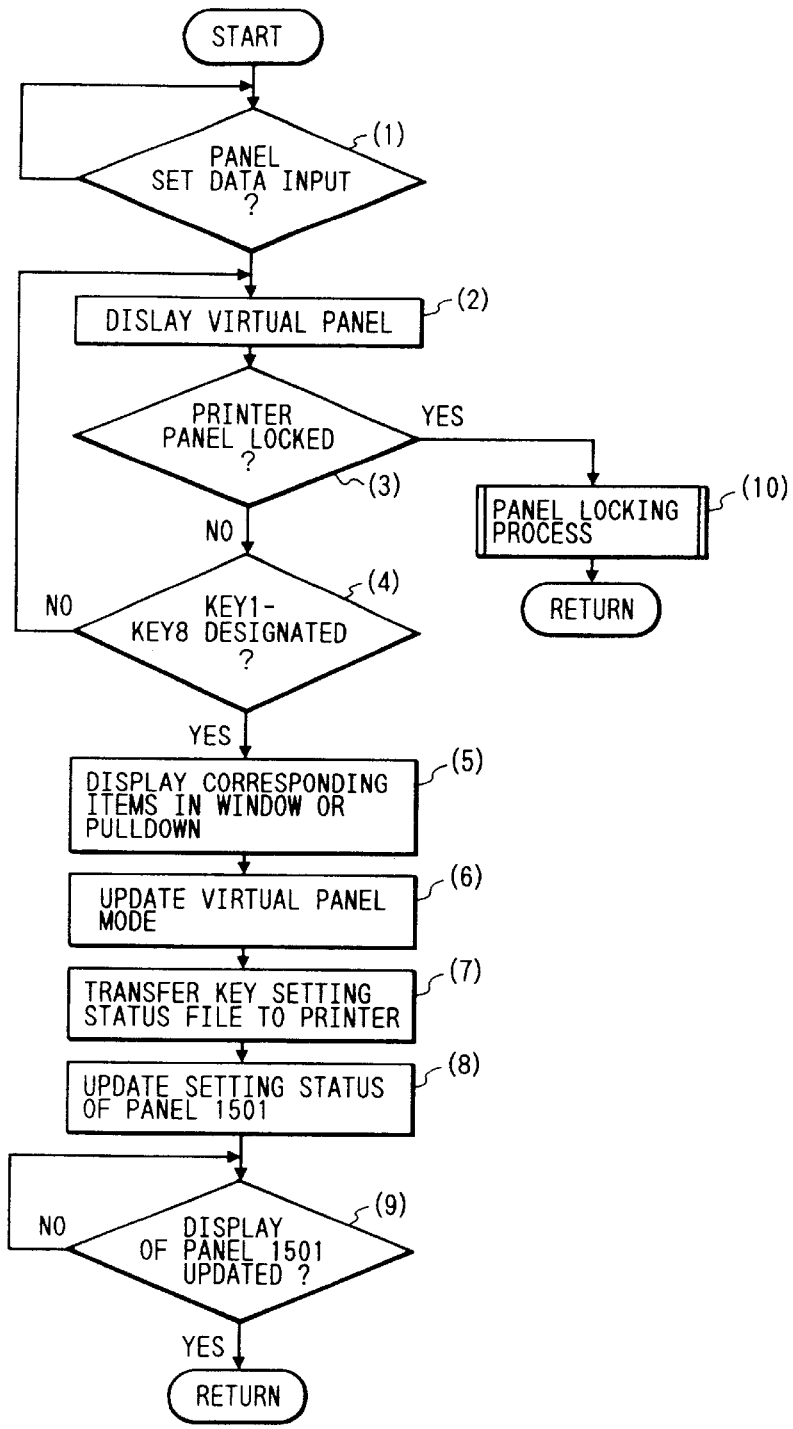
FIG. 10 is a flow chart showing a virtual panel simulation sequence shown in FIG. 5.

FIG. 10 is a flow chart showing a virtual panel simulation sequence shown in FIG. 5 that is performed by the CPU 1, in which processing steps (1) to (10) are illustrated.

First, in step (1), the CPU 1 of the host computer 100 waits until current panel setting status information (stored in the RAM 16) set in the printer 1500 is transferred. In step (2), in accordance with the input panel setting data, the CPU 1 displays the virtual panel by using the virtual panel image PI such that the display on a display D and indications of indicators L1 to L5 shown in FIG. 9 correspond to those of the operation panel 1501 of the printer 1500.

Subsequently, in step (3), the CPU 1 checks whether key-lock for disabling depression of all keys or keys except that for releasing errors of the printer 1500 is designated. If YES in step (3), the CPU 1 executes the routine of a printer panel locking process (to be described later) in step (10) and ends the processing.

If No in step (3), the CPU 1 checks in step (4) whether any of virtual keys KEY1 to KEY8 on the virtual panel image PI is designated. If NO in step (4), the flow returns to step (2). If YES in step (4), the CPU 1 displays items corresponding to the virtual keys KEY1 to KEY8 in a window or pulldown in step (5). In step (6), the CPU 1 updates the virtual panel mode display currently being set in accordance with the selected item. In step (7), the CPU 1 transfers the key setting status file corresponding to the settings of the keys KEY1 to KEY8 to the printer 1500. The CPU 1 then updates the setting status of the operation panel 1501 of the printer 1500 in step (8) and waits until the display status of the operation panel 1501 of the 1500 is updated in step (9), thereby ending the processing. This enables the display status of the operation panel 1501 of the printer 1500 to correspond to that of the virtual panel in accordance with the key operations and the mode display on the virtual panel image PI.

As described above, since the display status of the virtual panel image PI on the CRT 10 of the host computer 100 changes in association with the operations on the operation panel 1501 of the printer 1500, the operating environmental status of the printer 1500 can be easily confirmed on the screen of the host computer 100. In addition, in operating the virtual keys KEY1 to KEY8 corresponding to the virtual panel image PI on the CRT 10 of the host computer 100, an operator can perform the key operation while monitoring all items that can be set, and this key operation is reflected on the set result on the operation panel 1501 of the printer 1500. Note that in transferring data between the host computer 100 and the printer 1500, information may be exchanged between the host computer 100 and the printer 1500 whenever the key operation is performed. Furthermore, in this embodiment, the reaction (change in menu display or the like) for each key operation is simulated by the host computer 100, and, after the setting is completed by the host computer 100, the set contents are transferred to the printer 1500. However, the processing for selecting and displaying set items may also be executed by receiving information from the printer 1500. Consequently, a user can set the printer 1500 from the host computer 100 and can also check the environmental setting status of the printer 1500 without moving to the installation location of the printer.

Figure 11:
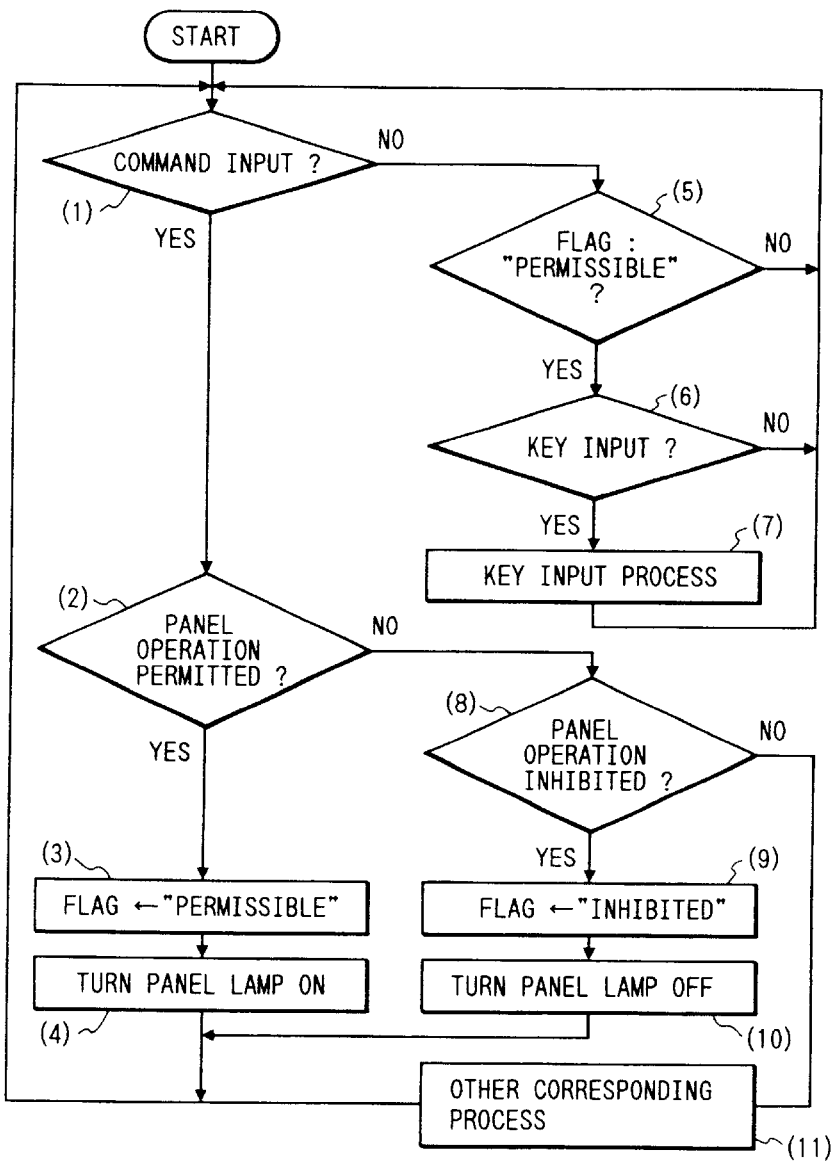
FIG. 11 is a flow chart showing a printer panel locking sequence shown in FIG. 5.

FIG. 11 is a flow chart showing a printer panel locking sequence shown in FIG. 5 that is performed by the CPU 14, in which processing steps (1) to (11) are illustrated.

First, in step (1), the CPU 14 of the printer 1500 checks whether some command is input from the host computer 100. If NO in step (1), the CPU 14 checks in step (5) whether a flag for permitting inputs from the keys arranged on the operation panel 1501 of the printer 1500 is currently permissible. If NO in step (5), the flow returns to step (1). If YES in step (5), the CPU 14 waits until a key input is supplied from the keys arranged on the operation panel 1501 of the printer 1500. If the key input is obtained in step (6), the CPU 14 executes a key input process in step (7), and the flow returns to step (1).

If YES in step (1), on the other hand, the CPU 14 checks in step (2) whether the input command is a command for permitting the panel operation on the operation panel 1501 of the printer 1500. If YES in step (2), the CPU 14 sets the state "permissible" for the flag for permitting inputs from the keys arranged on the operation panel 1501 of the printer 1500 in step (3) and turns a panel lamp on in step (4), thereby ending the processing.

If NO in step (2), the CPU 14 checks in step (8) whether the input command is a command for inhibiting the panel operation on the operation panel 1501 of the printer 1500. If NO in step (8), the CPU 14 executes other corresponding processes in step (11) and ends the processing.

If YES in step (8), the CPU 14 sets the state "inhibited" for a flag for inhibiting inputs from the keys arranged on the operation panel 1501 of the printer 1500 in step (9) and turns the panel lamp off in step (10), thereby ending the processing.

As described above, while the printer operating environment is being set from the virtual panel, the settings on the virtual panel are given priority by disabling the designation for the panel setting operation of the printer. Therefore, in a system in which the environment of the printer 1500 can be set from the setup utility, the panel simulation, or the like of the host computer 100, the operation on the operation panel of the printer 1500 can be temporarily inhibited by a command from the host computer 100. This effectively avoids an undesirable event in which another user carelessly changes the environmental settings of the printer 1500 in situations where the host computer and the printer 1500 are located apart from each other, i.e., where the printer functions as a so-called shared printer, thereby obtaining desired printing results. If, however, the panel operation inhibited state set in the printer 1500 continues for a long period of time, the function of the shared printer may be impaired. Therefore, as shown in FIG. 12, the system may be modified such that the inhibition time is managed by the counter function of the CPU 14, and, if a predetermined inhibition release time has elapsed, operations of the keys of the printer 1500 are enabled.

Figure 12:
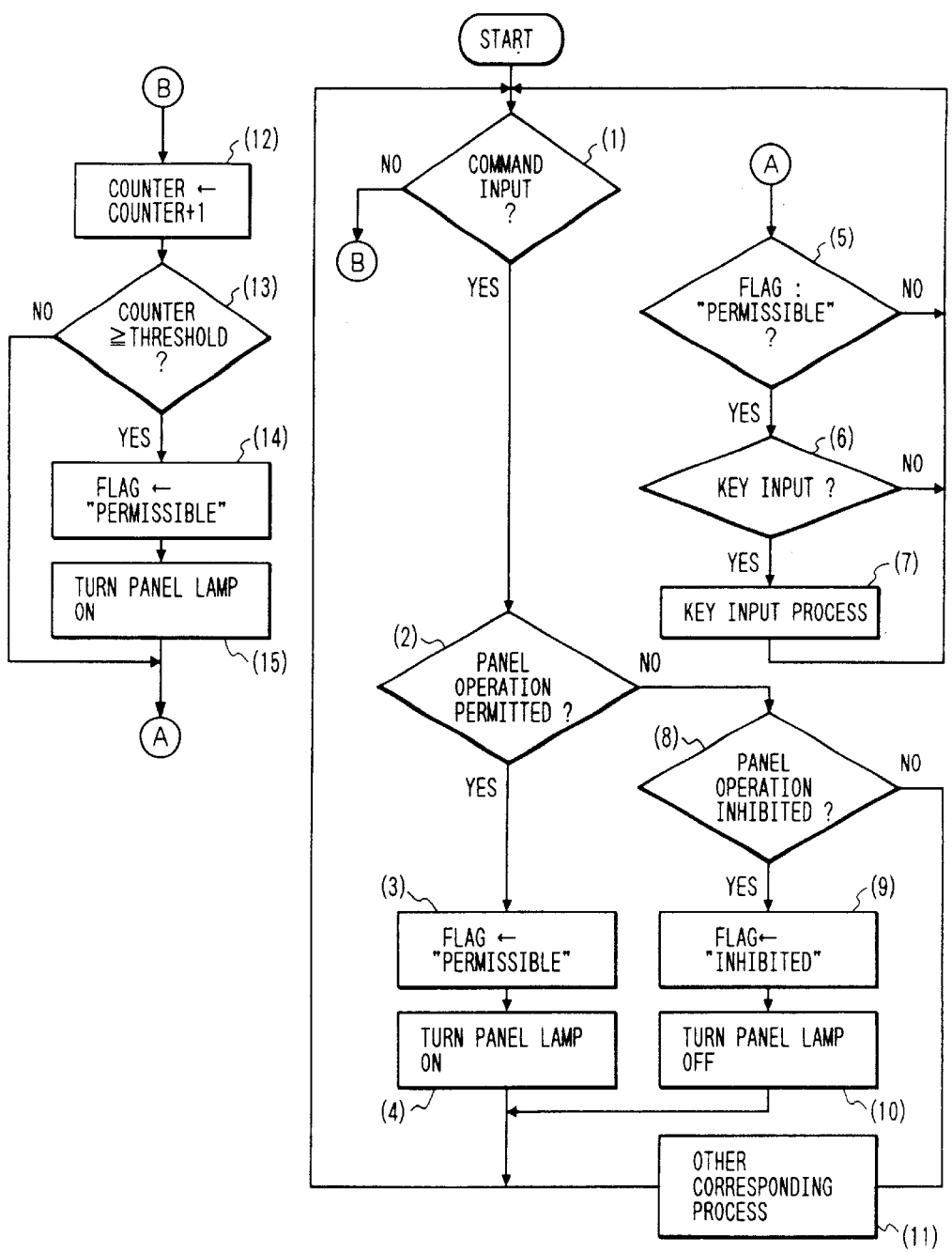
FIG. 12 is a flow chart showing another printer panel locking sequence different from that shown in FIG. 5.

FIG. 12 is a flow chart showing another printer panel locking sequence different from that shown in FIG. 5 that is performed by the CPU 14, in which processing steps (1) to (15) are illustrated.

First, in step (1), the CPU 14 of the printer 1500 checks whether some command is input from the host computer 100. If NO in step (1), the CPU 14 activates its internal counter in step (12) and checks in step (13) whether the value of the counter is equal to or larger than a count value which is set to release the panel operation inhibition. If NO in step (13), the flow advances to step (5) and the subsequent steps. If YES in step (13), the CPU 14 sets the state "permissible" for the flag for permitting inputs from the keys arranged on the operation panel 1501 of the printer 1500 in step (14) and turns the panel lamp on (15).

Subsequently, in step (5), the CPU 14 checks whether the flag for permitting inputs from the keys arranged on the operation panel 1501 of the printer 1500 is currently permissible. If NO in step (5), the flow returns to step (1). If YES in step (5), the CPU 14 waits until a key input is supplied from the keys arranged on the operation panel 1501 of the printer 1500 in step (6). If the key input is obtained in step (6), the CPU 14 executes a key input process in step (7), and the flow returns to step (1).

If YES in step (1), the CPU 14 checks in step (2) whether the input command is a command for permitting the panel operation on the operation panel 1501 of the printer 1500. If YES in step (2), the CPU 14 sets the state "permissible" for the flag for permitting inputs from the keys arranged on the operation panel 1501 of the printer 1500 in step (3) and turns the panel lamp on in step (4), thereby ending the processing.

If NO in step (2), the CPU 14 checks in step (8) whether the input command is a command for inhibiting the panel operation on the operation panel 1501 of the printer 1500. If NO in step (8), the CPU 14 executes other corresponding processes in step (11) and ends the processing.

If YES in step (8), the CPU 14 sets the state "inhibited" for the flag for inhibiting inputs from the keys arranged on the operation panel 1501 of the printer 1500 in step (9) and turns the panel lamp off in step (10), thereby ending the processing.

With the above arrangement, even when the key operation on the operation panel 1501 of the printer 1500 is disabled by the command designation from the host computer 100, the key operation enable state can be automatically restored.

Note that the control may be performed to enable the error release key operation on the operation panel 1501 of the printer 1500 if a paper feed jam or the like occurs during execution of the printer sequence by the printer mechanism 20 of the printer 1500.

Figure 13:
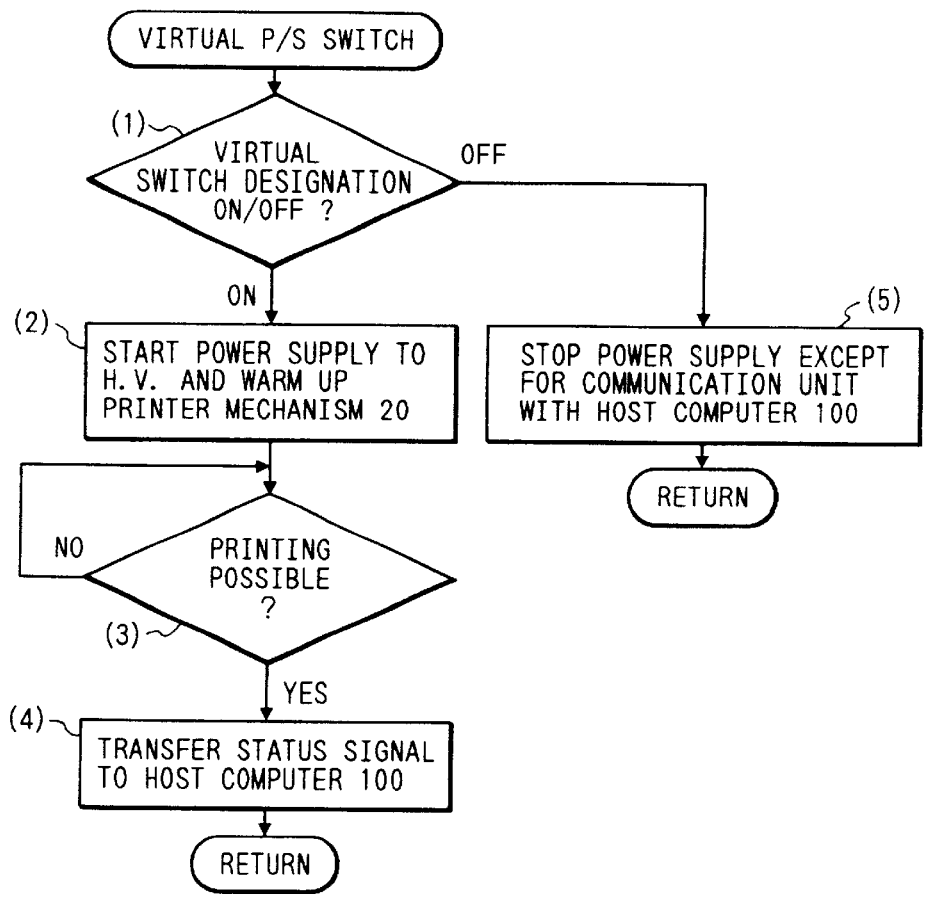
FIG. 13 is a flow chart showing a power switch (P/S) simulation sequence shown in FIG. 5.

FIG. 13 is a flow chart showing a power source switch simulation sequence shown in FIG. 5 that is performed by the CPU 1 and the CPU 14, in which processing steps (1) to (5) are illustrated.

This sequence is started when, for example, the position P2 is designated by the pointing device (not shown) on the display screen shown in FIG. 6. First, in step (1), the CPU 1 checks the ON/OFF state designated by the virtual switch. If ON is determined in step (1) and the printer is the laser beam printer shown in FIG. 1, power supply to H.V. is started and the printer mechanism 20 is warmed up in step (2). If the printer is the bubble jet printer as shown in FIG. 2, power supply to various drivers is started in order to activate the cleaning mechanism of the printer head.

Subsequently, when printing becomes possible in step (3), the CPU 14 transfers a printer status signal indicating a printer enable status to the host computer 100 in step (4) and ends the processing.

If OFF is determined in step (1), power supply to parts except a communication unit for performing communications with the host computer 100 is stopped in step (5), setting an apparent off-line status.

Figure 14:
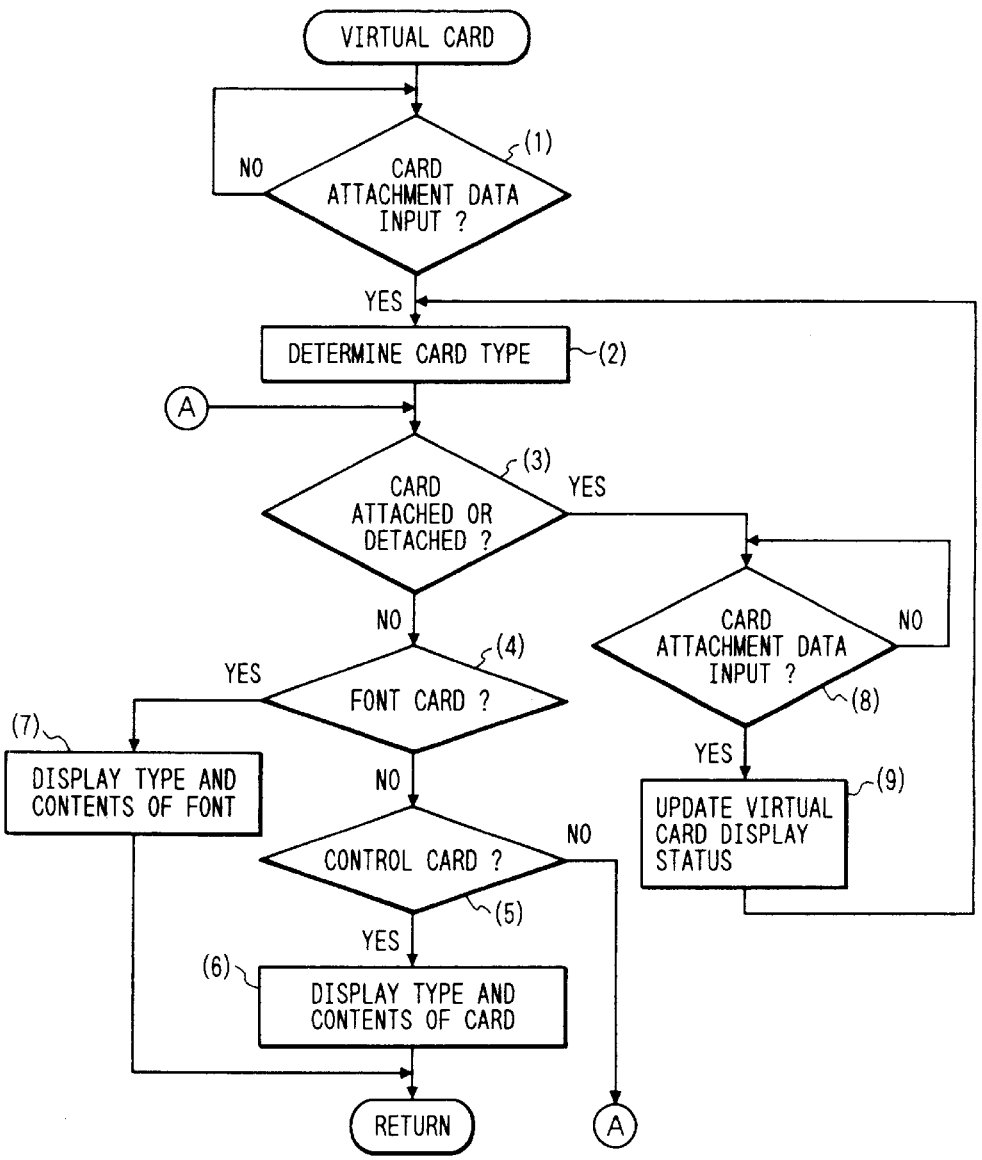
FIG. 14 is a flow chart showing an attached card simulation sequence shown in FIG. 5.

FIG. 14 is a flow chart showing an attached card simulation sequence shown in FIG. 5 that is performed by the CPU 1 and the CPU 14, in which processing steps (1) to (9) are illustrated.

First, in step (1), the CPU 14 waits until card attachment data is acquired from the printer 1500. In step (2), the CPU 14 analyzes the card attachment data acquired to determine the card type. After this determination, in step (3), the CPU 14 checks whether the card is attached to or detached from the printer 1500. If YES in step (3), the CPU 14 waits until the card attachment data is again acquired in step (8). When the card attachment data is acquired, the CPU 1 updates the virtual card display status on the CRT 10 of the host computer 100 in step (9), and the flow returns to step (2).

If NO in step (3), the CPU 14 checks in step (4) whether the attached card is a font card (style font card for determining, e.g., the printed style or the Gothic type). If YES in step (4), the CPU 1 displays the type and contents of the font together with the virtual printer image PIM1 in step (7) and ends the processing.

If NO in step (4), the CPU 14 checks in step (5) whether the attached card is a control card for, e.g., emulation. If NO in step (5), the flow returns to step (3). If YES in step (5), the CPU 1 displays the type and contents of the card together with the virtual printer image PIM1 in step (6) and ends the processing.

FIG. 15 is a flow chart showing an interface simulation sequence shown in FIG. 5 that is performed by the CPU 1, in which processing steps (1) and (2) are illustrated.

First, in step (1), the CPU 1 of the host computer 100 acquires interface status data from the printer 1500. Subsequently, in step (2), the CPU 1 displays, e.g., the interface type, the communication protocol, and the buffer capacity allocated to that interface together with the printer image PIM1 in step (2) and ends the processing.

FIG. 16 is a flow chart showing a paper feed cassette simulation sequence shown in FIG. 5 that is performed by the CPU 1, in which processing steps (1) and (2) are illustrated.

First, in step (1), the CPU 1 of the host computer 100 acquires paper feed cassette status data from the printer

1500. Subsequently, in step (2), the CPU displays the paper size and the number of remaining papers or paper sheets of the paper feed cassette which is enabled to perform paper feed, together with the virtual printer image PIM1, and ends the processing. If a plurality of paper feed cassettes can be stacked in a stack, the paper size and the number of remaining paper sheets of a paper feed cassette that is given priority for paper feed may be displayed together with the virtual printer image PIM1.

Figure 17:
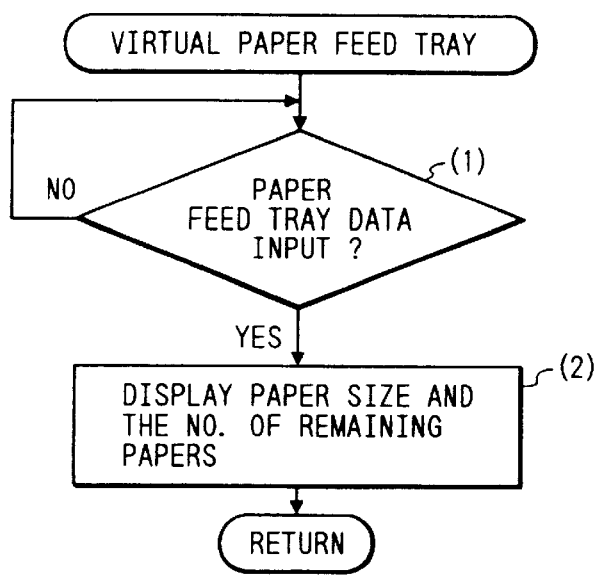
FIG. 17 is a flow chart showing a paper feed tray simulation sequence shown in FIG. 5.

FIG. 17 is a flow chart showing a paper feed tray simulation sequence shown in FIG. 5 that is performed by the CPU 1, in which processing steps (1) and (2) are illustrated.

First, in step (1), the CPU 1 of the host computer 100 acquires paper feed tray status data from the printer 1500. Subsequently, in step (2), the CPU 1 displays the paper size and the number of remaining paper sheets of a paper feed tray which is enabled to perform paper feed, together with the virtual printer image PIM1, and ends the processing.

Figure 18:
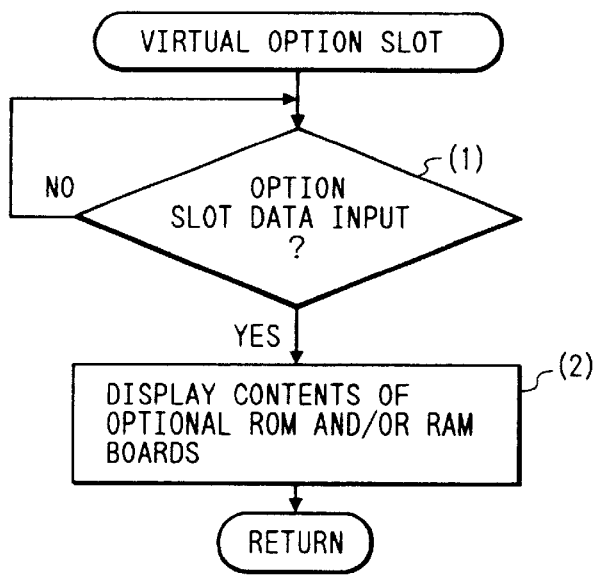
FIG. 18 is a flow chart showing an option slot simulation sequence shown in FIG. 5.

FIG. 18 is a flow chart showing an option slot simulation sequence shown in FIG. 5 that is performed by the CPU 1, in which processing steps (1) and (2) are illustrated.

First, in step (1), the CPU 1 of the host computer 100 acquires paper feed tray status data from the printer 1500. Subsequently, in step (2), the CPU 1 displays the contents of an optional ROM board and/or an optional RAM board attached to the option slot, together with the virtual printer image PIM3, in the message window MW as shown in FIG. 8, and ends the processing.

Figure 19:
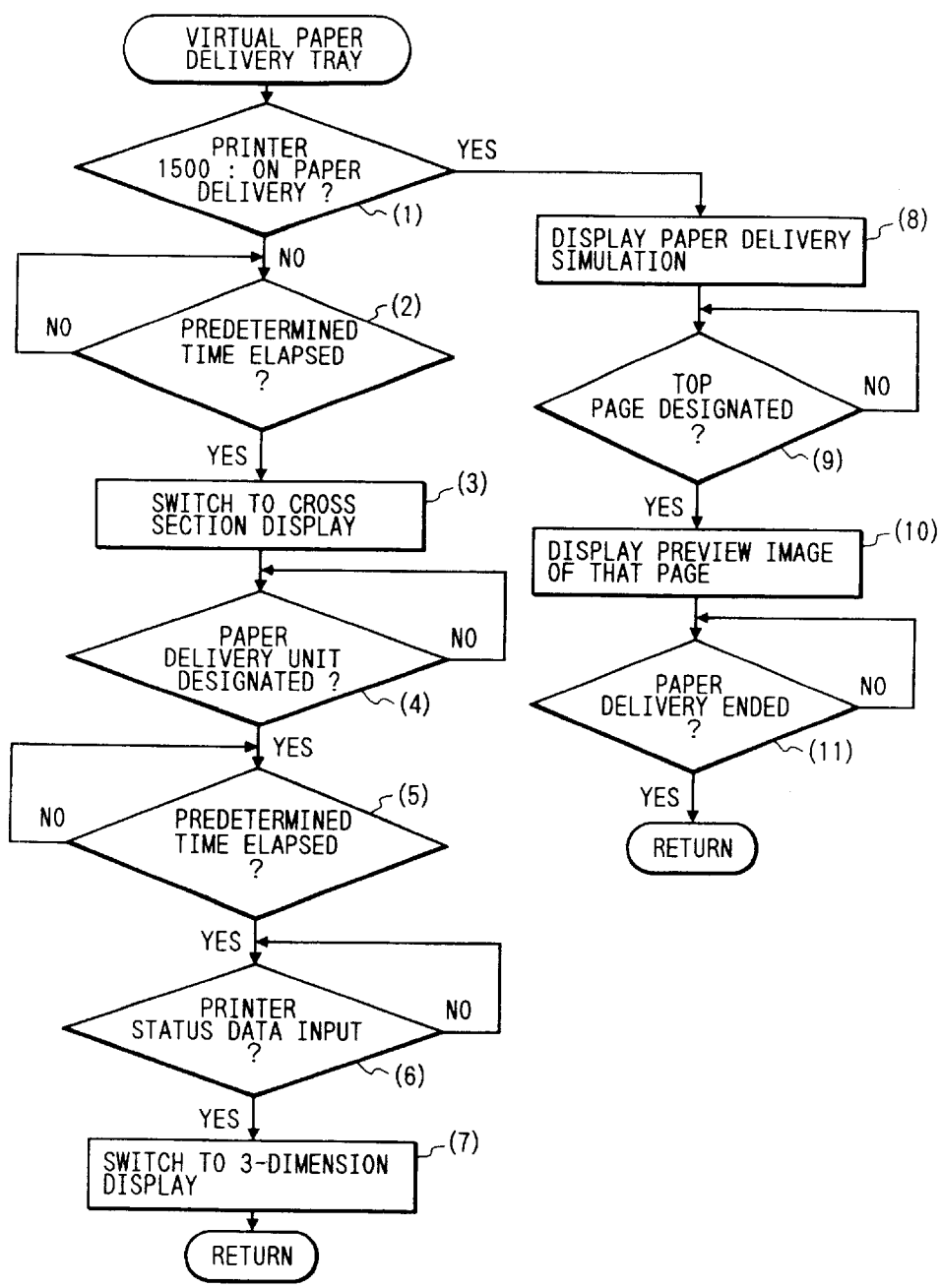
FIG. 19 is a flow chart showing a paper delivery tray simulation sequence shown in FIG. 5.

FIG. 19 is a flow chart showing a paper delivery tray simulation sequence shown in FIG. 5 that is performed by the CPU 1, in which processing steps (1) to (11) are illustrated.

Figure 20:
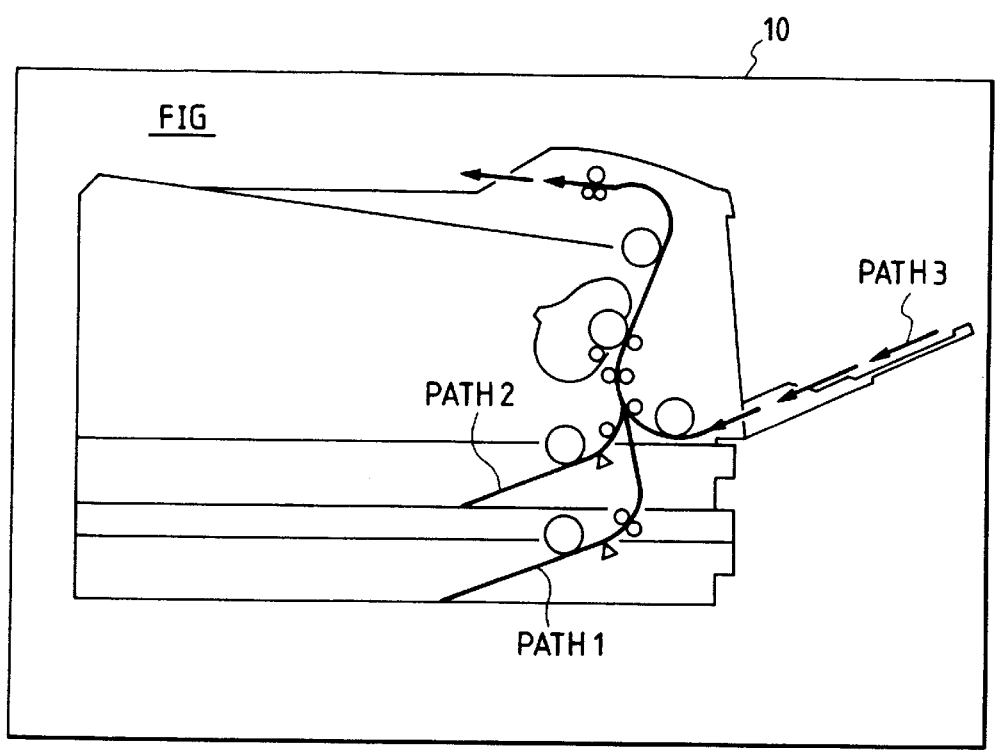
FIG. 20 is a view showing contents in a cross section display mode of a virtual printer in the printer control system according to the present invention.

First, in step (1), the CPU 1 of the host computer 100 checks from printer status information acquired whether the printer 1500 is executing paper delivery. If NO in step (1), the CPU 1 checks whether the position P6 corresponding to the paper delivery tray shown in FIG. 6 has been designated by the cursor K with the pointing device (not shown) for a predetermined time. If YES in step (2), the CPU 1 switches the 3-dimensional display of the virtual printer to a cross section display as shown in FIG. 20 in step (3), displaying paper feed paths PATH1 to PATH3. If a paper feed jam occurs during the paper feed, the CPU 1 cause a corresponding lamp to flicker at the position of the jammed paper. Note that in this printer cross section display mode, the condition of paper being fed is displayed as graphics in real time.

Subsequently, in the same printer cross section display state, if the paper delivery unit is designated by the cursor in step (4), and, if a predetermined time has elapsed in this designation state in step (5), the CPU 1 releases the printer cross section display mode and acquires current printer status data of the printer 1500 in step (6). The CPU 1 then switches to the 3-dimensional display of the virtual printer in step (7) and ends the processing. Note that the switching between the printer cross section display mode and the virtual printer need not be executed by the designation described above but may be performed at any given timing by another designation on the screen or designation from the key board or by detecting the change in designation status of the printer 1500.

If YES in step (1), the CPU 1 displays a paper deliver simulation on the CRT 10 of the host computer 100 in step (8). In this case, if the top page of virtual sheets of paper currently being delivered is designated by the cursor K with the pointing device (not shown) in step (9), the CPU 1 displays the preview image of that page on the CRT 10 of the host computer 100 in step (10). The CPU 1 then waits until the paper delivery is ended in step (11), and, when the paper delivery is ended, ends the processing.

Although the printer 1500 and the host computer 100 are connected through an RS232C in the above embodiment, the present invention is, of course, applicable to any bidirectional interface regardless of whether the interface is of a wired or radio type.

In some cases, a printer that is additionally registered as a usable printer is present or the key shape or the key position of a printer is changed by changes in version or the like. Even in these situations, however, the virtual display processing can be realized for any such commercially available printer by registering or updating virtual printer image data or virtual panel image data from a floppy disk drive (not shown) connectable to the host computer 100 or from a network.

What is claimed is:

1. An output apparatus comprising:
   a setting unit arranged for setting operating environment information for operation of said output apparatus;
   a changing unit arranged for changing the operating environment information set by said setting unit based on information acquired from an information processing apparatus connected thereto through a bidirectional interface; and
   an inhibiting unit arranged for inhibiting said setting unit from setting the operating environment information based on control information acquired from the information processing apparatus,
   wherein during an inhibiting process executed by said inhibiting unit, said setting unit is inhibited from setting the operating environment information through a manual operation of said setting unit and said changing unit is allowed to change the operating environment information based on the information acquired from the information processing apparatus.

2. An output apparatus according to claim 1, wherein said setting unit comprises an operation panel of said output apparatus.

3. An output apparatus according to claim 1, wherein said output apparatus is a laser beam printer.

4. An output apparatus according to claim 1, further comprising a termination unit arranged for terminating inhibition of said setting unit after a predetermined period.

5. An output apparatus according to claim 2, wherein said inhibiting unit inhibits said setting unit from setting the operating environment information by invalidating a key operation on the operation panel.

6. An output apparatus according to claim 1, further comprising a termination unit arranged for terminating inhibition of said setting unit based on control information from the information processing apparatus.

7. A system comprising an output apparatus and an information processing apparatus connected to each other through a bidirectional interface, wherein said output apparatus comprises:
   a setting unit arranged for setting operating environment information for operation of said output apparatus;
   a changing unit arranged for changing the operating environment information set by said setting unit based on information acquired from said information processing apparatus; and
   an inhibiting unit arranged for inhibiting said setting unit from setting the operating environment information based on control information acquired from said information processing apparatus, wherein during an inhibiting process executed by said inhibiting unit, said setting unit is inhibited from setting the operating environment information through a manual operation of said setting unit and said changing unit is allowed to change the operating environment information based on the information acquired from said information processing apparatus.

8. A system apparatus according to claim 7, wherein said setting unit comprises an operation panel of said output apparatus.

9. A system according to claim 7, wherein said output apparatus is a laser beam printer.

10. A system according to claim 7, wherein said output apparatus further comprises a termination unit arranged for terminating inhibition of said setting unit after a predetermined period.

11. A system according to claim 8, wherein said inhibiting unit inhibits said setting unit from setting the operating environment information by invalidating a key operation on the operation panel.

12. A system according to claim 7, wherein said output apparatus further comprises a termination unit arranged for terminating inhibition of said setting unit based on control information acquired from said information processing apparatus.

13. A system according to claim 7, wherein said information processing apparatus comprises a host computer.

14. A system according to claim 7, wherein said information processing apparatus comprises a display unit for displaying a virtual printer panel representative of an operation panel of a printer currently connected to said information processing apparatus.

15. A system according to claim 14, wherein said information processing apparatus further comprises a control unit arranged for changing status information displayed in the virtual printer panel and outputting a command to the printer to effect a corresponding change in the status of the printer.

16. A method of operating an output apparatus comprising the steps of:
  setting operating environment information for operation of the output apparatus;
  changing the operating environment information set in said setting step based on information acquired from an information processing apparatus connected to the output apparatus through a bidirectional interface; and
  inhibiting setting the operating environment information in said setting step based on control information acquired from the information processing apparatus,
  wherein in said inhibiting step, setting the operating environment information in said setting step through a manual operation of a setting unit is inhibited and the operating environment information is allowed to be changed in said changing step based on the information acquired from the information processing apparatus.

17. A method according to claim 16, wherein said setting step sets the operating environment information using an operation panel of the output apparatus.

18. A method according to claim 16, wherein the output apparatus is a laser beam printer.

19. A method according to claim 16, further comprising the step of terminating inhibition of said setting step after a predetermined period.

20. A method according to claim 17, wherein said inhibiting step inhibits said setting step from setting the operating environment information by invalidating a key operation on the operation panel.

21. A method according to claim 16, further comprising the step of terminating inhibition of said setting step based on control information acquired from the information processing apparatus.

22. A method of operating a system comprising an output apparatus and an information processing apparatus connected to each other through a bidirectional interface, said method comprising the steps of:
  setting operating environment information for operation of the output apparatus;
  changing the operating environment information set in said setting step based on information acquired from the information processing apparatus; and
  inhibiting setting the operating environment information in said setting step based on control information acquired from the information processing apparatus,
  wherein in said inhibiting step, setting the operating environment information in said setting step through a manual operation of a setting unit is inhibited and the operating environment information is allowed to be changed in said changing step based on the information acquired from the information processing apparatus.

23. A method according to claim 22, wherein said setting step sets the operating environment information using an operation panel of the output apparatus.

24. A method according to claim 22, wherein the output apparatus is a laser beam printer.

25. A method according to claim 22, further comprising the step of terminating inhibition of said setting step after a predetermined period.

26. A method according to claim 23, wherein said inhibiting step inhibits said setting step from setting the operating environment information by invalidating a key operation on the operation panel.

27. A method according to claim 22, further comprising the step of terminating inhibition of said setting step based on control information acquired from the information processing apparatus.

28. A method according to claim 22, wherein the information processing apparatus comprises a host computer.

29. A method according to claim 22, further comprising the step of displaying in the information processing apparatus a virtual printer panel representative of an operation panel of a printer currently connected to the information processing apparatus.

30. A method according to claim 29, further comprising the steps of:
  changing status information displayed in the virtual printer panel; and
  outputting a command to the printer to effect a corresponding change in the status of the printer.

* * * * *

UNITED STATES PATENT AND TRADEMARK OFFICE
CERTIFICATE OF CORRECTION

PATENT NO. : 6,717,693 B2
DATED : April 6, 2004
INVENTOR(S) : Shunya Mitsuhashi et al.

It is certified that error appears in the above-identified patent and that said Letters Patent is hereby corrected as shown below:

Column 4,
Line 37, "UC" should read -- IJC --.

Signed and Sealed this

Fourteenth Day of September, 2004

JON W. DUDAS
*Director of the United States Patent and Trademark Office*